US012494211B2

(12) United States Patent
Breebaart et al.

(10) Patent No.: US 12,494,211 B2
(45) Date of Patent: Dec. 9, 2025

(54) PROCESSING PARAMETRICALLY CODED AUDIO

(71) Applicants: Dolby Laboratories Licensing Corporation, San Francisco, CA (US); DOLBY INTERNATIONAL AB, Dublin (IE)

(72) Inventors: Dirk Jeroen Breebaart, Ultimo (AU); Michael Eckert, Ashfield (AU); Heiko Purnhagen, Sundbyberg (SE)

(73) Assignees: Dolby Laboratories Licensing Corporation, San Francisco, CA (US); DOLBY INTERNATIONAL AB, Dublin (IE)

( * ) Notice: Subject to any disclaimer, the term of this patent is extended or adjusted under 35 U.S.C. 154(b) by 269 days.

(21) Appl. No.: 18/043,905

(22) PCT Filed: Sep. 7, 2021

(86) PCT No.: PCT/US2021/049285
§ 371 (c)(1),
(2) Date: Mar. 2, 2023

(87) PCT Pub. No.: WO2022/055883
PCT Pub. Date: Mar. 17, 2022

(65) Prior Publication Data

US 2023/0335142 A1 Oct. 19, 2023

Related U.S. Application Data

(60) Provisional application No. 63/075,889, filed on Sep. 9, 2020.

(30) Foreign Application Priority Data

Sep. 9, 2020 (EP) .................................... 20195258

(51) Int. Cl.
*G10L 19/008* (2013.01)
*G10L 19/16* (2013.01)
*G10L 19/22* (2013.01)

(52) U.S. Cl.
CPC ............ *G10L 19/008* (2013.01); *G10L 19/22* (2013.01)

(58) Field of Classification Search
CPC ....... G10L 19/00; G10L 19/20; G10L 19/002; G10L 19/08; G10L 19/012; G10L 19/02;
(Continued)

(56) References Cited

U.S. PATENT DOCUMENTS 8,583,656 B1 11/2013 Kwatra
9,042,573 B2 * 5/2015 Åhgren .................. H04R 3/005 381/94.3

(Continued)

FOREIGN PATENT DOCUMENTS

GB 2510650 B 7/2015
RU 2382485 C2 2/2010

(Continued)

OTHER PUBLICATIONS

Vilkamo et al "Optimized Covariance Domain Framework for Time-Frequency Processing of Spatial Audio", J. Audio Eng. Soc., vol. 61, No. 6, pp. 403-411 (Year: 2013).*

(Continued)

*Primary Examiner* — Leshui Zhang

(57) ABSTRACT

A method comprising receiving a first input bit stream for a first parametrically coded input audio signal, the first input bit stream including data representing a first input core audio signal and a first set including at least one spatial parameter relating to the first parametrically coded input audio signal. A first covariance matrix of the first parametrically coded audio signal is determined based on the spatial parameter(s)

(Continued)

of the first set. A modified set including at least one spatial parameter is determined based on the determined first covariance matrix, wherein the modified set is different from the first set. An output core audio signal is determined, which is based on, or constituted by, the first input core audio signal. An output bit stream for a parametrically coded output audio signal is generated, the output bit stream including data representing the output core audio signal and the modified set.

19 Claims, 3 Drawing Sheets

(58) Field of Classification Search

CPC ... G10L 19/24; G10L 19/0017; G10L 19/032; G10L 19/03; G10L 19/008; G10L 19/22; G10L 19/167; G10L 19/0204; G10L 19/0212; G10L 19/06; G10L 19/12; G10L 19/017; G10L 19/04; G10L 19/18; G10L 19/022; G10L 19/0208; G10L 19/07; G10L 19/107; G10L 21/038; G10L 21/02; G10L 21/0388; G10L 21/0232; G10L 21/0364; G10L 21/0272; G10L 21/00; G10L 21/0216; G10L 25/21; G10L 25/06; G10L 25/51; G10L 25/18; G10L 25/12; G10L 25/03; G06F 12/0815; G10H 1/183; H04S 3/00; H04S 3/02; H04S 3/008

USPC ................... 704/500–504; 381/1–23; 700/94

See application file for complete search history.

(56) References Cited

U.S. PATENT DOCUMENTS 9,495,970 B2 11/2016 Dickins
9,788,119 B2 10/2017 Vilermo
9,979,829 B2 5/2018 Cartwright
10,152,979 B2 12/2018 Murtaza
2007/0260340 A1* 11/2007 Mao ....................... H04R 3/005 700/94
2008/0249644 A1* 10/2008 Jehan ................... G11B 27/322
2009/0222272 A1 9/2009 Seefeldt
2010/0125352 A1* 5/2010 Yamada .............. G10L 21/0272 706/12
2014/0112482 A1 4/2014 Virette
2014/0233762 A1* 8/2014 Vilkamo ................ G10H 1/183 381/119
2015/0049872 A1 2/2015 Virette
2016/0125859 A1* 5/2016 Eronen ................... G10L 25/51 700/94
2016/0353222 A1 12/2016 Disch
2017/0243589 A1 8/2017 Krueger
2019/0251938 A1* 8/2019 Vilkamo ............... G10L 19/008
2020/0015028 A1 1/2020 Pihlajakuja
2021/0377685 A1* 12/2021 Laitinen .................... H04S 3/02
2022/0295212 A1* 9/2022 Vilkamo ................. H04S 7/302

FOREIGN PATENT DOCUMENTS

WO 2017035281 A2 3/2017
WO 2017176941 A1 10/2017
WO 2019129350 W 7/2019

OTHER PUBLICATIONS

Breebaart, J. et al "Spatial Audio Processing: MPEG Surround and other Applications", John Wiley & Sons, Chichester, UK, Dec. 2007, 33 pages.
Engdegord J et al: "Spatial Audio Object Coding (SAOC)—The Upcoming MPEG Standard on Parametric Object Based Audio Coding", 124th AES Convention, Audio Engineering Society, Paper 7377,, May 17, 2008 (May 17, 2008), pp. 1-15, XP002541458.
Immersive Audio Coding for Virtual Reality Using a Metadata-Assisted Extension of the 3GPP EVS Codec ICASSP 2019-2019 IEEE International Conference on Acoustics, Speech and Signal Processing (ICASSP), IEEE, May 12, 2019, pp. 730-734, XP033566263.
ISO/IEC 11172-3:1993(E), Information technology—Coding of moving pictures and associated audio for digital storage media at up to about 1.5 Mbit/s—Part 3: Audio.
Purnhagen, H. et al "Immersive Audio Delivery Using Joint Object Coding" AES Convention, May 2016.
Tdoc S4-180806 "Dolby VRStream audio profile candidate—Description of Bitstream, Decoder, and Renderer plus informative Encoder Description" Source: Dolby Laboratories, Inc. Jul. 9-13, 2018, Rome, Italy.
Villemoes, L. et al "Decorrelation for Audio Object Coding" IEEE published in Acoustics, Speech and Signal Processing, Mar. 2017, pp. 706-709.

* cited by examiner

PROCESSING PARAMETRICALLY CODED AUDIO

CROSS-REFERENCE TO RELATED APPLICATIONS

This application is a U.S. National Stage of International Application No. PCT/US2021/049285, filed Sep. 7, 2021, which claims priority to U.S. Provisional Application No. 63/075,889, filed Sep. 9, 2020 and European Patent Application No. 20195258.7, filed Sep. 9, 2020, each of which is hereby incorporated by reference in its entirety.

TECHNICAL FIELD

Embodiments of the invention relate to audio processing. Specifically, embodiments of the invention relate to processing of parametrically coded audio.

BACKGROUND

Audio codecs have evolved from strictly spectral coefficient quantization and coding (e.g., in the Modified Discrete Cosine Transform, MDCT, domain) to hybrid coding methods that involve parametric coding methods, in order to extend bandwidth and/or number of channels from a mono (or low-channel count) core signal. Examples of such (spatial) parametric coding methods include MPEG Parametric Stereo (High-Efficiency Advanced Audio Coding (HE-AAC) v2), MPEG Surround, and tools for joint coding of channels and/or objects in the Dolby AC-4 Audio System, such as Advanced Coupling (A-CPL), Advanced Joint Channel Coding (A-JCC) and Advanced Joint Object Coding (A-JOC). Several audio streams may be combined (mixed together) to create an output bitstream. It is desirable to improve efficiency in processing of parametrically coded audio.

SUMMARY

Methods, systems, and non-transitory computer-readable mediums for processing of parametrically coded audio are disclosed.

A first aspect relates to a method. The method comprises receiving a first input bit stream for a first parametrically coded input audio signal, the first input bit stream including data representing a first input core audio signal and a first set including at least one spatial parameter relating to the first parametrically coded input audio signal. A first covariance matrix of the first parametrically coded audio signal is determined based on the spatial parameter(s) of the first set. A modified set including at least one spatial parameter is determined based on the determined first covariance matrix, wherein the modified set is different from the first set. An output core audio signal is determined, which is based on, or constituted by, the first input core audio signal. An output bit stream for a parametrically coded output audio signal is generated, the output bit stream including data representing the output core audio signal and the modified set.

A second aspect relates to a system. The system comprises one or more processors (e.g., computer processors). The system comprises a non-transitory computer-readable medium storing instructions that are configured to, upon execution by the one or more processors, cause the one or more processors to perform a method according to the first aspect.

A third aspect relates to a non-transitory computer-readable medium. The non-transitory computer-readable medium is storing instructions that are configured to, upon execution by one or more processors (e.g., computer processors), cause the one or more processors to perform a method according to the first aspect.

Embodiments of the invention may improve efficiency in processing of parametrically coded audio (e.g., no full decoding of every audio stream may be required), may provide higher quality (no re-encoding of the audio stream (s) may be required), and may have a relatively low latency. Embodiments of the invention are suitable for manipulating immersive audio signals, including audio signals for conferencing. Embodiments of the invention are suitable for mixing immersive audio signals. Further advantages and/or technical effects related to embodiments of the invention will be described or become apparent by the description in the following, e.g., by the description in the following relating to the appended drawings.

Embodiments of the invention are for example applicable to audio codecs that re-instate spatial parameters between channels, such as, for example, MPEG Surround, HE-AAC v2 Parametric Stereo, AC-4 (A-CPL, A-JCC), AC-4 Immersive Stereo, or Binaural Cue Coding (BCC). Descriptions of these spatial parametric coding methods are provided in Breebaart, J., Faller, C. (2007), “Spatial Audio Processing: MPEG Surround and other applications”, Wiley, ISBN: 978-0-470-03350-0, the content of which is hereby incorporated by reference herein in its entirety, for all purposes. Embodiments of the invention can also be applied to audio codecs that allow for a combination of channel-based, object-based, and scene-based audio content, such as Dolby Digital Plus Joint Object Coding (DD+JOC) and Dolby AC-4 Advanced Joint Object Coding (AC-4 A-JOC).

In the context of the present application, by a modified set including at least one spatial parameter being different from another set including at least one spatial parameter (e.g., the first set), such as in the context of determining a modified set including at least one spatial parameter based on the determined first covariance matrix, wherein the modified set is different from the first set, it may be meant that at least one element (or spatial parameter) of the modified set is different from the element(s) (or spatial parameter(s)) of the first set.

BRIEF DESCRIPTION OF THE DRAWINGS

Embodiments of the present invention will be described in more detail with reference to the appended drawings, illustrating embodiments of the invention.

DETAILED DESCRIPTION OF EMBODIMENTS

Figure 1:
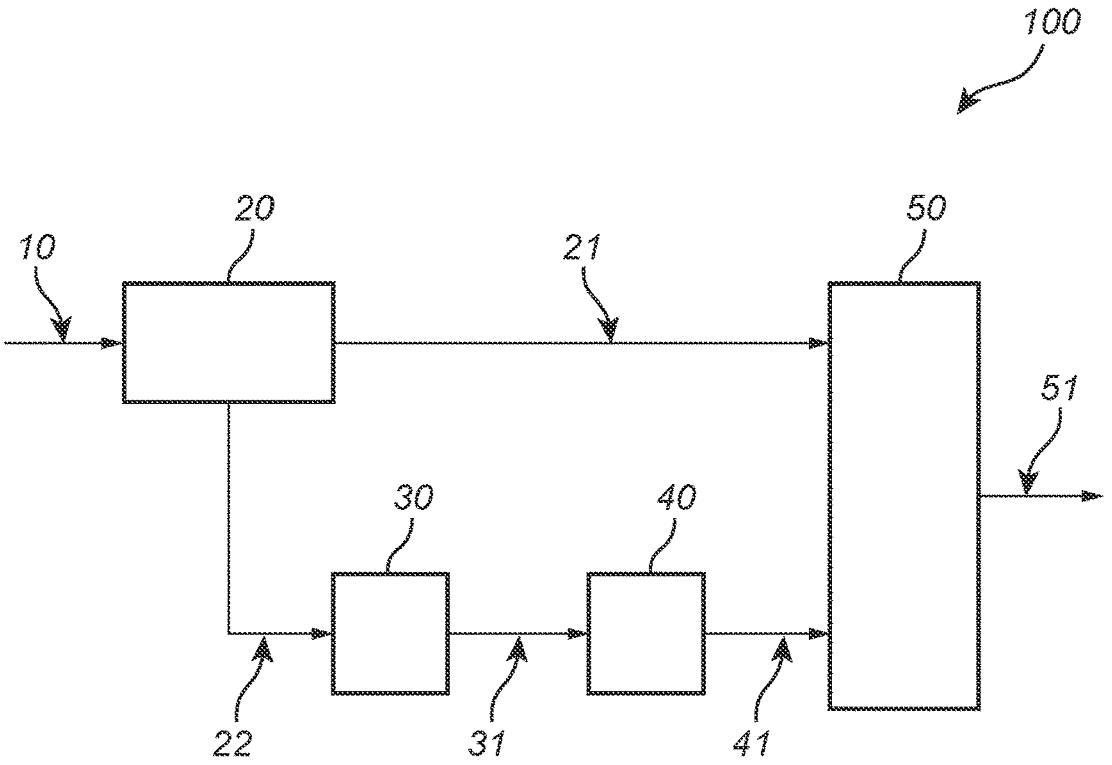
FIGS. 1 to 4 are schematic views of systems according to embodiments of the invention.

When several audio streams need to be combined (mixed together) to create an output bitstream, conventional techniques for parametric spatial coding schemes, such as MPEG parametric stereo coding, may require the following steps:

1. Decode the mono (or low-channel count) core signal(s) using a core coder.
2. Transform the time-domain signal into an oversampled (and possibly complex-valued) representation (using, e.g. Discrete Fourier Transform (DFT) or Quadrature Mirror Filter (QMF)).
3. Re-instate the spatial parameters to reconstruct the higher-channel count representation.

4. Inverse transform the reconstructed higher-channel count representation to generate time-domain audio signals.
5. Mix time-domain audio signals from multiple audio streams.
6. Transform the mixed time-domain audio signals into an oversampled (and possibly complex-valued) representation (using, e.g. DFT or QMF).
7. Generate a low-channel count (mono) downmix by downmixing.
8. Extract spatial parameters for the mixture.
9. Inverse transform the down-mix signal to the time domain.
10. Encode the down-mix signal using a core encoder.

The above-mentioned steps 4, 5, 6 may possibly be combined. Nevertheless, the mixing involves decoding, parametric reconstruction, mixing, parameter extraction, and re-encoding of every audio stream. These steps may have the following drawbacks:

- The latency (delay) introduced by the multiple subsequent transforms can be substantial or even problematic, for example in a telecommunications application.
- Decoding and re-encoding may result in an undesirable perceived loss of sound quality for the user, especially when parametric coding tools are employed. This perceived loss of sound quality may be due to parameter quantization and replacement of residual signals by decorrelator outputs.
- The transforms, decoding, and re-encoding steps may introduce a complexity that may be substantial, which may cause significant computational load on the provider or device that performs the mixing process. This may increase cost or reduce battery life for the device that performs the mixing process.

According to one or more embodiments of the invention, one or more input bit streams (or input streams), each being for a parametrically coded input audio signal, may be received. Based on spatial parameters of each or any input bitstream, a covariance matrix may be determined (e.g., reconstructed, or estimated), e.g., of the (intended) output presentation. Covariance matrices for two or more input bit streams may be combined, to obtain an output, or combined, covariance matrix. Core audio signals or streams (e.g., low-channel count, such as mono, core audio signals or streams) for two or more input bit streams may be combined. New spatial parameters may be determined (e.g., extracted) from the output covariance matrix. An output bit stream may be created from the determined spatial parameters and the combined core signals.

Embodiments of the invention—such as the ones described in the foregoing and in the following with reference to the appended drawings—may for example improve efficiency in processing of parametrically coded audio.

FIG. 1 is a schematic view of a system 100 according to an embodiment of the invention. The system 100 may comprise one or more processors and a non-transitory computer-readable medium storing instructions that are configured to, upon execution by the one or more processors, cause the one or more processors to perform a method according to an embodiment of the invention.

A first input bit stream 10 for a first parametrically coded input audio signal is received. The first input bit stream includes data representing a first input core audio signal and a first set including at least one spatial parameter relating to the first parametrically coded input audio signal. The system 100 may include a demultiplexer 20 (e.g., a first demultiplexer) that may be configured to separate (e.g., demultiplex) the first input bit stream 10 into the first input core audio signal 21 and the first set 22 including at least one spatial parameter relating to the first parametrically coded input audio signal. The demultiplexer 20 could in alternative be referred to as a (first) bit stream processing unit, a (first) bit stream separation unit, or the like.

The first input bit stream 10 may for example comprise or be constituted by a core audio stream, such as an audio signal encoded by a core encoder.

A first covariance matrix 31 of the first parametrically coded audio signal is determined based on the spatial parameter(s) of the first set. To that end, the system 100 may include a covariance matrix determining unit 30 that may be configured to determine the first covariance matrix 31 of the first parametrically coded audio signal based on the spatial parameter(s) of the first set 22, which first set 22 may be input into the covariance matrix determining unit 30 after being output from the demultiplexer 20, as illustrated in FIG. 1.

Determination of the first covariance matrix 31 may comprise determination of the diagonal elements thereof as well as at least some, or all, off-diagonal elements of the first covariance matrix 31.

A modified set 41, including at least one spatial parameter, is determined based on the determined first covariance matrix, wherein the modified set is different from the first set. To that end, the system 100 may include a spatial parameter determination unit 40 that may be configured to determine the modified set 41, including at least one spatial parameter, based on the determined first covariance matrix 31, which first covariance matrix 31 may be input into the spatial parameter determination unit 40 after being output from the covariance matrix determining unit 30, as illustrated in FIG. 1.

An output core audio signal is determined based on, or constituted by, the first input core audio signal. According to the embodiment of the invention illustrated in FIG. 1, the output core audio signal is constituted by the first input core audio signal 21.

An output bit stream 51 for a parametrically coded output audio signal is generated, the output bit stream including data representing the output core audio signal and the modified set. To that end, the system 100 may include an output bitstream generating unit 50 that may be configured to generate the output bit stream 51 for a parametrically coded output audio signal, wherein the output bit stream 51 includes data representing the output core audio signal and the modified set 41. As illustrated in FIG. 1, the output bitstream generating unit 50 may take as inputs the output core audio signal (which in accordance with the embodiment of the invention illustrated in FIG. 1 is constituted by the first input core audio signal 21) and the modified set 41, and output the output bit stream 51. The output bitstream generating unit 50 may be configured to multiplex the output core audio signal and the modified set 41. The output core audio signal may for example be determined by the output bitstream generating unit 50.

The first parametrically coded input audio signal may represent sound captured from at least two different microphones, such as, for example, sound captured from stereo or First Order Ambisonics microphones. It is to be understood that this is only an example, and that, in general, the first parametrically coded input audio signal (or the first input bit stream 10) may represent in principle any captured sound, or captured audio content.

Compared to conventional techniques for processing of parametrically coded audio, in the processing of parametrically coded audio as illustrated in FIG. 1, there may be less or even no need for full decoding of every audio stream and/or re-encoding of the audio stream(s). Thereby, processing of parametrically coded audio such as illustrated in FIG. 1 may have a relatively high efficiency and/or quality.

The first parametrically coded input audio signal and the parametrically coded output audio signal may employ the same spatial parametrization coding type, or the first parametrically coded input audio signal and the parametrically coded output audio signal may employ different spatial parametrization coding types. The different spatial parametric coding types may for example comprise MPEG parametric stereo parametrization, Binaural Cue Coding, Spatial Audio Reconstruction (SPAR), object parameterization in Joint Object Coding (JOC) or Advanced JOC (A-JOC) (e.g., object parameterization in A-JOC for Dolby AC-4), or Dolby AC-4 Advanced Coupling (A-CPL) parametrization. Thus, the first parametrically coded input audio signal and the parametrically coded output audio signal may employ different ones of for example MPEG parametric stereo parametrization, Binaural Cue Coding, SPAR (or a similar coding type), JOC, A-JOC, or A-CPL parametrization. Thus, systems and methods according to one or more embodiments of the invention can be used to transcode between one spatial parametric coding method to another without requiring a full decode and re-encode of the output signals. SPAR is described for example in 2019 IEEE International Conference on Acoustics, Speech and Signal Processing (ICASSP), "Immersive Audio Coding for Virtual Reality Using a Metadata-assisted Extension of the 3GPP EVS Codec", McGrath, Bruhn, Purnhagen, Eckert, Torres, Brown, and Darcy, 12-17 May 2019, and in 3GPP TSG-SA4 #99 meeting, Tdoc S4-180806, 9-13 Jul. 2018, Rome, Italy, the contents of both of which are hereby incorporated by reference herein in their entirety, for all purposes. JOC and A-JOC are described for example in Villemoes, L., Hirvonen, T., Purnhagen, H. (2017), "Decorrelation for audio object coding", 2017 IEEE International Conference on Acoustics, Speech and Signal Processing (ICASSP), and in Purnhagen, H., Hirvonen, T., Villemoes, L., Samuelsson, J., Klejsa, J., "Immersive Audio Delivery Using Joint Object Coding", Dolby Sweden AB, Stockholm, Sweden, Audio Engineering Society (AES) Convention: 140 (May 2016) Paper Number: 9587 (the contents of which are hereby incorporated by reference herein in their entirety, for all purposes).

Spatial parameterization tools and techniques may be used to determine (e.g., reconstruct, or estimate) a normalized covariance matrix, e.g., a covariance matrix that is independent of the overall signal level. In such a case, several solutions can be employed to determine the covariance matrix. For example, one or more of the following methods may be used:

- The signal levels may be measured from the core audio representation. Subsequently, a normalized covariance estimate can be scaled to ensure that the signal autocorrelation is correct.
- Bit stream elements can be added to represent (overall) signal levels in each time/frequency tile.
- Covariance without normalization can be included in the bit stream instead of normalized covariance.
- A quantized representation of audio levels in time/frequency tiles may already be present in certain bit stream formats. That data may be used to scale the normalized covariance matrices appropriately.
- Any combination of the methods above, for example by adding (delta) energy data in the bit stream that represent the difference between an estimate of overall power derived from the core audio representation, and the actual overall power.

According to one or more embodiments of the invention, covariance matrices may be determined (e.g., reconstructed, or estimated) and parameterized in individual time/frequency tiles, sub-bands or audio frames.

While the elements of the system 100 have been described in the foregoing as separate components, it is to be understood that the system 100 may comprise one or more processors that may be configured to implement the above-described functionalities of the demultiplexer 20, the covariance matrix determining unit 30, the spatial parameter determination unit 40, and the output bitstream generating unit 50. Each or any of the respective functionalities may for example be implemented by one or more processors. For example, one (e.g., a single) processor may implement the above-described functionalities of the demultiplexer 20, the covariance matrix determining unit 30, the spatial parameter determination unit 40, and the output bitstream generating unit 50, or the above-described respective functionalities of the demultiplexer 20, the covariance matrix determining unit 30, the spatial parameter determination unit 40, and the output bitstream generating unit 50 may be implemented by separate processors.

According to one or more embodiments of the invention, there may be one input bit stream with spatial parameters (e.g., the first input bitstream 10 illustrated in FIG. 1), and one input bit stream without spatial parameters and being mono only. In addition to the processing of parametrically coded audio as illustrated in FIG. 1 (or in FIG. 2), a second input bit stream for a mono audio signal may be received (the second input bit stream for a mono audio signal is not illustrated in FIG. 1). The second input bit stream may include data representing the mono audio signal. A second covariance matrix may be determined based on the mono audio signal and a matrix including desired spatial parameters for the second input bit stream (which second input bit stream thus is mono only). Based on the first input core audio signal and the mono audio signal, a combined core audio signal may be determined. Based on the determined first covariance matrix and the determined second covariance matrix, a combined covariance matrix may be determined (e.g., by summing the first and second covariance matrices). The modified set may be determined based on the determined combined covariance matrix, wherein the modified set is different from the first set. The output core audio signal may be determined based on the combined core audio signal. For example, the second covariance matrix may be determined based on energy of the mono audio signal (if the mono audio signal is denoted by matrix Y, the energy may be given by $YY^*$, where * denotes conjugate transpose) and a matrix including desired spatial parameters for the second input bit stream. The desired spatial parameters for the second input bit stream may for example comprise one or more of amplitude panning parameters or head-related transfer function parameters (for the mono object associated with the mono audio signal).

Figure 2:
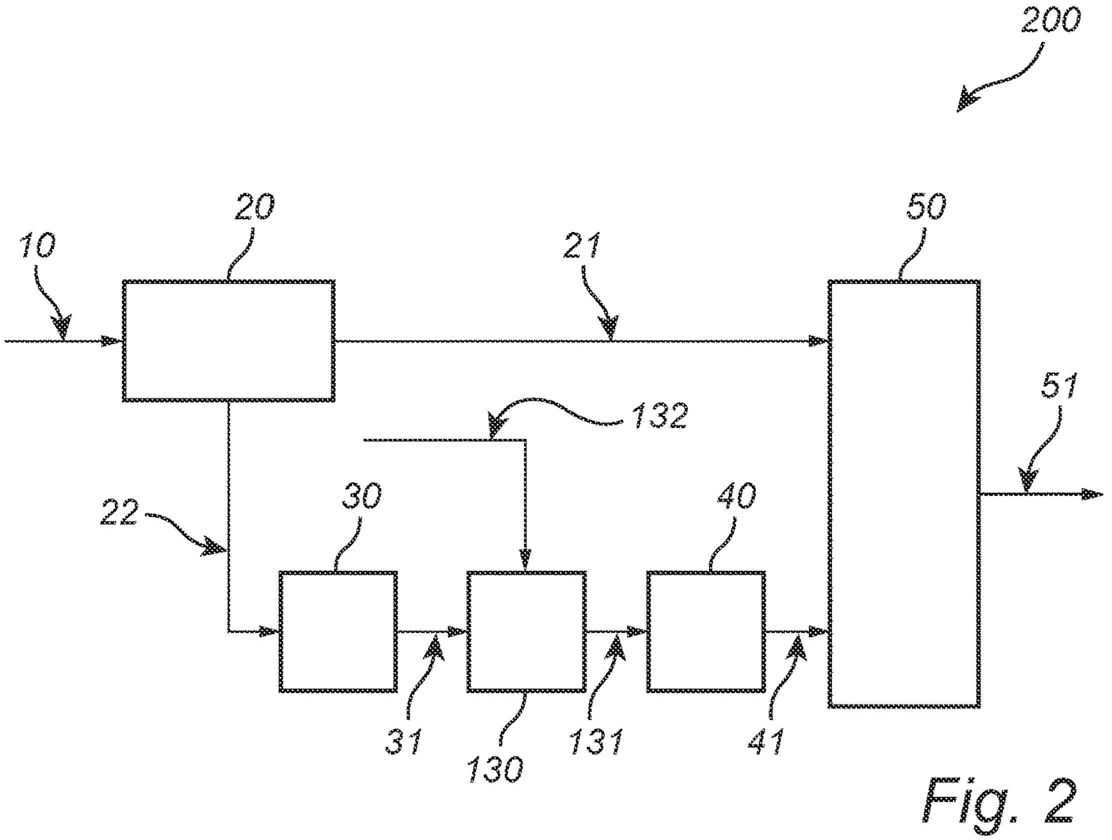

FIG. 2 is a schematic view of a system 200 according to another embodiment of the invention. The system 200 may comprise one or more processors and a non-transitory computer-readable medium storing instructions that are configured to, upon execution by the one or more processors, cause the one or more processors to perform a method according to an embodiment of the invention. The system 200 illustrated in FIG. 2 is similar to the system 100 illustrated in FIG. 1. The same reference numerals in FIGS. 1 and 2 denote the same or similar elements, having the same or similar function. The following description of the embodiment of the invention illustrated in FIG. 2 will focus on the differences between it and the embodiment of the invention illustrated in FIG. 1. Therefore, features which are common to both embodiments may be omitted from the following description, and so it should be assumed that features of the embodiment of the invention illustrated in FIG. 1 are or at least can be implemented in the embodiment of the invention illustrated in FIG. 2, unless the following description thereof requires otherwise.

Compared to the system 100 illustrated in FIG. 1, in the system 200 illustrated in FIG. 2, prior to determining the modified set 41, the determined first covariance matrix 31 is modified based on output bitstream presentation transform data of the first input bitstream 10, wherein the output bitstream presentation transform data comprises a set of signals intended for reproduction on a selected audio reproduction system. To that end, the system 200 may include a covariance matrix modifying unit 130, which may be configured to modify the determined first covariance matrix 31 based on output bitstream presentation transform data 132 of the first input bitstream 10. As illustrated in FIG. 2, the covariance matrix modifying unit 130 may take as inputs (1) output bitstream presentation transform data 132 of the first input bitstream 10 and (2) the first covariance matrix 31 after being output from the covariance matrix determining unit 30, as illustrated in FIG. 2, and output a modified first covariance matrix 131 (as compared to the first covariance matrix 31 output from the covariance matrix determining unit 30 and prior to being modified in the covariance matrix modifying unit 130). A modified set 41, including at least one spatial parameter, is determined based on the first covariance matrix 131 that has been modified in the covariance matrix modifying unit 130, wherein the modified set 41 is different from the first set 22. The spatial parameter determination unit 40 illustrated in FIG. 2 may be configured to determine the modified set 41 based on the modified first covariance matrix 131.

Thus, in accordance with the embodiment of the invention illustrated in FIG. 2, a presentation transformation (such as mono, or stereo, or binaural) can be integrated into the processing of parametrically coded audio, based on manipulation or modification of covariance matrix/matrices.

Examples of presentation transformations that can (effectively) modify the covariance matrix include, but are not limited to:

(1) Transformations that can be described as a (time and/or frequency dependent, and possibly complex-valued) matrix operation from input to output signals. If a stereo input signal is denoted by matrix Y, the output signal by matrix X, and a transformation by matrix D, a presentation transformation can be expressed as X=DY. Consequently, the covariance matrix $R_{XX}$ of the output signals X may be derived from the covariance matrix $R_{YY}$ of the input signal Y according to $R_{XX}=DR_{YY}D^*$, where * denotes conjugate transpose. Hence, in these cases, the presentation transformation can be realized by a modification of the covariance matrix given by $R_{XX}=DR_{YY}D^*$. Examples of such presentation transformations include downmixing, re-mixing, rotation of a scene, or transforming a loudspeaker presentation into a (binaural) headphones presentation.

(2) Auditory-scene analysis-based modifications derived from and modifying a covariance matrix, such as the modification of the positions of one or more talkers in a conference call or rotating a sound field (see U.S. Pa. No. 9,979,829 B2, the content of which is hereby incorporated by reference herein in its entirety, for all purposes).

For example with reference to example (1) above and with further reference to FIG. 2, the output bitstream presentation transform data 132 may for example comprise at least one of down-mixing transformation data for down-mixing the first input bit stream 10, re-mixing transformation data for re-mixing the first input bit stream 10, or headphones transformation data for transforming the first input bit stream 10. The headphones transformation data may comprise a set of signals intended for reproduction on headphones.

In the following is a description of how presentation transformations can be employed in the covariance domain. It is assumed that one sub-band of a multi-channel signal is represented by X[c, k] with k being the sample index, and c being the channel index. The covariance matrix of X[c, k], given by $R_{XX}$, is then given by:

$$R_{XX}=XX^*,$$

with X* being the conjugate transposed (or Hermitian) matrix of X. It is further assumed that the presentation transformation can be described by means of a sub-band matrix C to generate the transformed signals Y:

$$Y=CX$$

The covariance matrix of the resulting output signals $R_{YY}$ is given by:

$$R_{YY}=YY^*=CXX^*C^*=CR_{XX}C^*$$

In other words, the transformation C can be applied by means of a pre- and post-matrix applied to $R_{XX}$. One example in which this transformation may be particularly useful is when there are several input bit streams received (cf. e.g., FIG. 3 and the description referring thereto), and one input bit stream represents a mono microphone feed that needs to be converted into a binaural presentation in the output bit stream. In that case, the sub-band matrix C may consist of complex-valued gains representing the desired head-related transfer function in the sub-band domain.

While the elements of the system 200 have been described in the foregoing as separate components, it is to be understood that the system 200 may comprise one or more processors that may be configured to implement the above-described functionalities of the demultiplexer 20, the covariance matrix determining unit 30, the covariance matrix modifying unit 130, the spatial parameter determination unit 40, and the output bitstream generating unit 50. Each or any of the respective functionalities may for example be implemented by one or more processors. For example, one (e.g., a single) processor may implement the above-described functionalities of the demultiplexer 20, the covariance matrix determining unit 30, the covariance matrix modifying unit 130, the spatial parameter determination unit 40, and the output bitstream generating unit 50, or the above-described respective functionalities of the demultiplexer 20, the covariance matrix determining unit 30, the covariance matrix modifying unit 130, the spatial parameter determination unit 40, and the output bitstream generating unit 50 may be implemented by separate processors.

Figure 3:
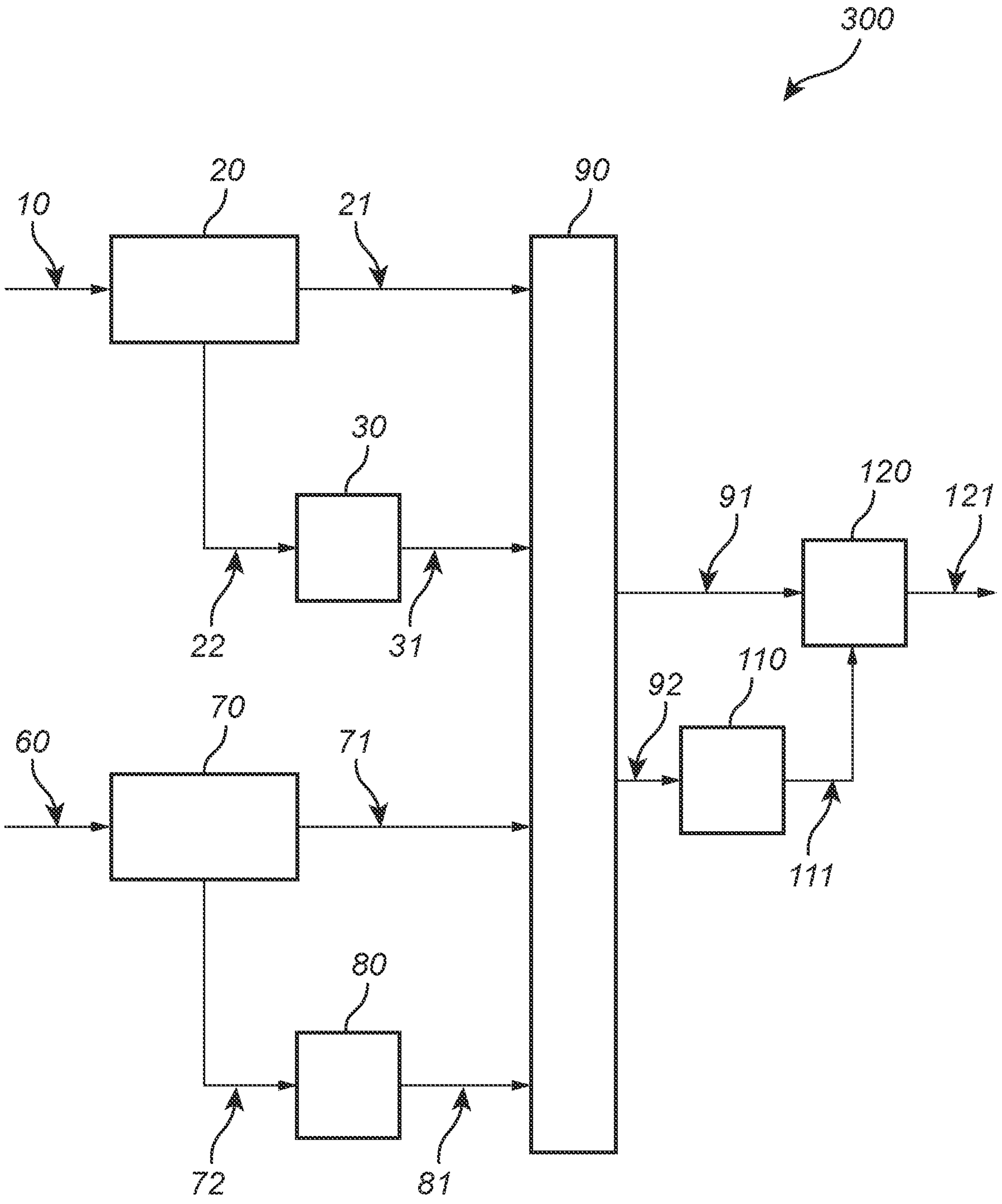

FIG. 3 is a schematic view of a system 300 according to another embodiment of the invention. The system 300 may comprise one or more processors and a non-transitory computer-readable medium storing instructions that are configured to, upon execution by the one or more processors, cause the one or more processors to perform a method according to an embodiment of the invention. The system 300 illustrated in FIG. 3 is similar to the system 100 illustrated in FIG. 1. The same reference numerals in FIGS. 1 and 3 denote the same or similar elements, having the same or similar function. The following description of the embodiment of the invention illustrated in FIG. 3 will focus on the differences between it and the embodiment of the invention illustrated in FIG. 1. Therefore, features which are common to both embodiments may be omitted from the following description, and so it should be assumed that features of the embodiment of the invention illustrated in FIG. 1 are or at least can be implemented in the embodiment of the invention illustrated in FIG. 3, unless the following description thereof requires otherwise.

Compared to FIG. 1, in FIG. 3, more than one input bit stream is received.

As illustrated in FIG. 3, a first input bit stream 10 for a first parametrically coded input audio signal is received. The first input bit stream includes data representing a first input core audio signal and a first set including at least one spatial parameter relating to the first parametrically coded input audio signal. The system 300 may include a demultiplexer 20 (e.g., a first demultiplexer) that may be configured to separate (e.g., demultiplex) the first input bit stream 10 into the first input core audio signal 21 and the first set 22 including at least one spatial parameter relating to the first parametrically coded input audio signal. The demultiplexer 20 could in alternative be referred to as a (first) bit stream processing unit, a (first) bit stream separation unit, or the like.

A first covariance matrix 31 of the first parametrically coded audio signal is determined based on the spatial parameter(s) of the first set. To that end, the system 300 may include a covariance matrix determining unit 30 that may be configured to determine the first covariance matrix 31 of the first parametrically coded audio signal based on the spatial parameter(s) of the first set 22, which first set 22 may be input into the covariance matrix determining unit 30 after being output from the demultiplexer 20, as illustrated in FIG. 3.

Determination of the first covariance matrix 31 may comprise determination of the diagonal elements thereof as well as at least some, or all, off-diagonal elements of the first covariance matrix 31.

As further illustrated in FIG. 3, a second input bit stream 60 for a second parametrically coded input audio signal is received. The second input bit stream includes data representing a second input core audio signal and a second set including at least one spatial parameter relating to the second parametrically coded input audio signal. The system 300 may include a demultiplexer (or a second demultiplexer) 70 that may be configured to separate (e.g., demultiplex) the second input bit stream 60 into the second input core audio signal 71 and the second set 72 including at least one spatial parameter relating to the second parametrically coded input audio signal. The (second) demultiplexer 70 could in alternative be referred to as a (second) bit stream processing unit, a (second) bit stream separation unit, or the like.

Each or any of the first input bit stream 10 and the second input bit stream 60 may for example comprise or be constituted by a core audio stream such as an audio signal encoded by a core encoder.

A second covariance matrix 81 of the second parametrically coded input audio signal is determined based on the spatial parameter(s) of the second set. To that end, the system 300 may include a covariance matrix determining unit 80 (e.g., a second covariance matrix determining unit) that may be configured to determine the second covariance matrix 81 of the second parametrically coded audio signal based on the spatial parameter(s) of the second set 72, which second set 72 may be input into the covariance matrix determining unit 80 after being output from the demultiplexer 70, as illustrated in FIG. 3.

Determination of the second covariance matrix 81 may comprise determination of the diagonal elements thereof as well as at least some, or all, off-diagonal elements of the second covariance matrix 81.

Based on the first input core audio signal 21 and the second input core audio signal 71, a combined core audio signal 91 is determined. Based on the determined first covariance matrix 31 and the determined second covariance matrix 81, an output covariance matrix 92 is determined. To that end, the system 300 may include a combiner unit 90, which may be configured to determine the combined core audio signal 91 based on the first input core audio signal 21 and the second input core audio signal 71. The combiner unit 90 may be configured to determine the output covariance matrix 92 based on the determined first covariance matrix 31 and the determined second covariance matrix 81. As illustrated in FIG. 3, the first input core audio signal 21 and the second input core audio signal 71 may be input into the combiner unit 90 after being output from the demultiplexer 20 and the demultiplexer 70, respectively, and the determined first covariance matrix 31 and the determined second covariance matrix 81 may be input into the combiner unit 90 after being output from the covariance matrix determining unit 30 and the covariance matrix determining unit 80, respectively.

Determining of the output covariance matrix 92 may for example comprise summing the determined first covariance matrix 31 and the determined second covariance matrix 81. The sum of the first covariance matrix 31 and the second covariance matrix 81 may constitute the output covariance matrix 92.

Descriptions of exemplifying methods for mixing or combining parametrically coded audio signals, and covariance matrices, are provided in the following, wherein the notation of Villemoes, L., Hirvonen, T., Purnhagen, H. (2017), "Decorrelation for audio object coding", 2017 IEEE International Conference on Acoustics, Speech and Signal Processing (ICASSP) (the content of which is hereby incorporated by reference herein in its entirety, for all purposes), is used.

Consider an original N-channel signal X, which is downmixed to an M-channel signal Y=DX in the encoder, where D is an M×N downmix matrix. In the decoder, an approximation $\hat{X}$ of the input signal may be reconstructed from the downmix signal Y as $$\hat{X}=CY+Pd(QY),$$

using an N×M dry upmix matrix C, an N×K wet upmix matrix P, an K×N pre-matrix Q and a set of K independent (i.e., mutually decorrelated) decorrelators do. In A-JOC, for example, C and P are computed in the encoder and conveyed in the bit stream, and Q is computed in the decoder as $$Q=|P|^T C$$

The parameters C, P, and Q may be computed per time/frequency tile and such that full covariance reinstatement $R_{XX}=R_{\hat{X}\hat{X}}$ is achieved, where $R_{UV}=\mathrm{Re}(UV^*)$ is the sample covariance matrix. The computation of C, P, and Q may only require the original covariance matrix $R_{XX}$ and the downmix matrix D as input. It is possible to compute the parameters such that the upmix is "downmix-compatible," i.e., $Y=D\hat{X}$. The covariance of the decoded signal is $$R_{\hat{X}\hat{X}}=CR_{YY}C^T+P\Lambda P^T,$$

where $R_{YY}=DR_{XX}D^T$ is the covariance matrix of the downmix, and where $\Lambda$ is the covariance matrix of the K decorrelator output signals, i.e., the diagonal part of $QR_{YY}Q^T$.

Two spatial signals $X_1$ and $X_2$ can be combined in to a mixed signal with $N_3$ channels as 5 the weighted sum $$X_3=G_1X_1+G_2X_2,$$

where $G_1$ and $G_2$ are the mixing weight matrices with dimensions $N_3\times N_1$ and $N_3\times N_2$, respectively.

If the signals $X_1$ and $X_2$ are available in parametrically coded form, they can be decoded and added to obtain $$X_{3C}=G_1\hat{X}_1+G_2\hat{X}_2,$$

where the "C" in the subscript of $X_{3C}$ indicates that the mixture was derived from the decoded signals $\hat{X}_1$ and $\hat{X}_2$. Subsequently, $X_{3C}$ can be parametrically encoded again. However, this does not necessarily ensure that parametric representation of $X_{3C}$ is the same as that of $X_3$, and hence also $\hat{X}_{3C}$ and $\hat{X}_3$ could be different.

It may be desirable to mix the signals in the parametric/downmix domain, because this may have various advantages as compared to the full decoding of the two signals, mixing, and subsequent re-encoding of the mixture $X_{3C}$, such as one or more of the following:

1. Lower computational complexity.
2. Lower latency by avoiding operating the filter banks required to process time/frequency tiles.
3. Improved quality by avoiding cascaded decorrelation.

It the following it is assumed that N, M, K, and D are the same for $\hat{X}_1$ and $\hat{X}_2$, that D is known beforehand, and that the mixing weight matrices are identity matrices $G_1=G_2=I$ with $N_1=N_2=N_3=N$, so that the desired mixed signal is simply the sum of the two original signals. The input to the mixing process in the parametric/downmix domain is given by the downmix signals $Y_1$ and $Y_2$ together with the parameters $C_1$, $P_1$, $Q_1$ and $C_2$, $P_2$, $Q_2$. The task at hand is now to compute $Y_{3P}$ and $C_{3P}$, $P_{3P}$, $Q_{3P}$, where the "P" in the subscript indicates that mixing happens in the parametric/downmix domain.

The downmix of the sum $X_3$ can be determined, without approximations, as $$Y_{3P}=Y_3=D(X_1+X_2)=DX_1+DX_2=Y_1+Y_2.$$

Computation (or approximation) of the covariance matrix $R_{X3X3}$ of the desired mixture $X_3$ is less straight forward. The covariance matrix of the sum $X_{3C}$ of the decoded signals $\hat{X}_1$ and $\hat{X}_2$ can be written as:

$$R_{X3CX3C}=Re((\hat{X}_1+\hat{X}_2)(\hat{X}_1+\hat{X}_2)^*)=R_{\hat{X}1\hat{X}1}+R_{\hat{X}2\hat{X}2}+R_{\hat{X}1\hat{X}2}+R_{\hat{X}1\hat{X}2}^T.$$

The first two contributions can be derived as:

$$R_{\hat{X}1\hat{X}1}=C_1R_{Y1Y1}C_1^T+P_1\Lambda_1P_1^T,$$

$$R_{\hat{X}2\hat{X}2}=C_2R_{Y2Y2}C_2^T+P_2\Lambda_2P_2^T,$$

while two remaining contributions are more complex:

$$R_{\hat{X}1\hat{X}2}=C_1Re(Y_1Y_2^*)C_2^T+C_1Re(Y_1(d2(Q_2Y_2))^*)P_2^T+P_1Re(d1(Q_1Y_1)Y_2^*)C_2^T+P_1Re(d1(Q_1Y_1)(d2(Q_2Y_2))^*)P_2^T.$$

Assuming that all decorrelators d1( ) and d2( ) are mutually decorrelated, it can be justified to assume that all elements of this sum except for the first one are zero. This means that the two last contributions to $R_{X3CX3C}$ can be approximated using:

$$R_{\hat{X}1\hat{X}2}\approx C_1R_{Y1Y2}C_2^T.$$

Given this approximation, the covariance matrix of the sum $X_{3C}$ can now be written as:

$$R_{X3CX3C}\approx C_1R_{Y1Y1}C_1^T+P_1\Lambda_1P_1^T+C_2R_{Y2Y2}C_2^T+P_2\Lambda_2P_2^T+C_1R_{Y1Y2}C_2^T+C_2R_{Y1Y2}^TC_1^T.$$

This means that $R_{Y1Y1}$, $R_{Y2Y2}$, and $R_{Y1Y2}$ need to be known when mixing signals in the parametric/downmix domain in order to be able to compute this approximation of $R_{X3CX3C}$. $R_{Y1Y1}$, $R_{Y2Y2}$, and $R_{Y1Y2}$ can be derived by analyzing the actual downmix signals $Y_1$ and $Y_2$ (which may require some form of analysis filterbank or transform to enable access to time/frequency tiles, and which may imply some latency). An alternative would be to convey even $R_{Y1Y1}$ and $R_{Y2Y2}$ in the bit stream (per time/frequency tile) and furthermore assume, for example, that the downmix signals are uncorrelated, i.e., $R_{Y1Y2}=0$. Using one of these approximations of $R_{X3CX3C}$ as $R_{X3PX3P}$ together with the known D, it is possible to compute $C_{3P}$, $P_{3P}$, and $Q_{3P}$ in the same way as in the original parametric encoder, and use it together with $Y_{3P}$ as determined above.

As per the foregoing description, the covariance (e.g., $R_{Y1Y1}$ and $R_{Y2Y2}$) of the downmix signals may be determined (e.g., computed) from the received bit streams. Information about the covariance (e.g., $R_{Y1Y1}$ and $R_{Y2Y2}$) of the downmix signals may be embedded in the received bit streams. It may be assumed that downmixes are uncorrelated (e.g., $R_{Y1Y2}=0$).

For the case of parametric stereo as implemented in Dolby AC-4 A-CPL, the following may apply:

$N=2$, $M=1$, $K=1$, $D=(1/2)[1\ 1]$, $Q=1$, $C=[1+a\ 1-a]^T$, $P=[b-b]^T$, where a and b are the parameters conveyed in the bit stream per time/frequency tile, and where $\Lambda=R_{YY}$. Using the assumption that the decorrelators d1( ) and d2( ) are mutually decorrelated as discussed above, this gives $$R_{X3PX3P}\approx(C_1C_1^T+P_1P_1^T)R_{Y1Y1}+(C_2C_2^T+P_2P_2^T)R_{Y2Y2}+(C_1C_2^T+C_2C_1^T)R_{Y1Y2},$$

because $R_{Y1Y1}$, $R_{Y2Y2}$ and $R_{Y1Y2}$ are scalars in this case. Assuming furthermore that the downmix signals are uncorrelated, i.e., $R_{Y1Y2}=0$, this means that the approximated covariance matrix $R_{X3PX3P}$ of the mixture may be determined as a sum of contributions from both decoded signals to be mixed, weighted by the variance of their respective downmix signals.

Specifically, if a first input stream has A-CPL parameters $(a_1, b_1)$, and a second input stream has A-CPL parameters $(a_2, b_2)$, and the two input streams represent independent signals, the sum of these two streams has A-CPL parameters (a, b) is given by:

$$a=(1-\alpha)a_1+\alpha a_2$$

$$b^2=(1-\alpha)b_1^2+\alpha b_2^2+\alpha(1-\alpha)(a_1-a_2)^2$$

with $$\alpha=R_{Y2Y2}/(R_{Y1Y1}+R_{Y2Y2}).$$

Further to the descriptions in the foregoing of exemplifying methods for mixing or combining parametrically coded audio signals and covariance matrices, in the following exemplifying methods for determining covariance matrices of a parametrically coded audio signal are provided, using the same notation as in the foregoing descriptions of exemplifying methods for mixing or combining parametrically coded audio signals and covariance matrices. Determining of a covariance matrix (e.g., the first covariance matrix 31, or the second covariance matrix 81) of a parametrically coded audio signal based on the spatial parameter (s) relating to the parametrically coded audio signal, which spatial parameter(s) may be included in a bit stream for the parametrically coded audio signal, may for example comprise (1) determining a downmix signal of the parametrically coded audio signal, (2) determining a covariance matrix of the downmix signal, and (3) determining the covariance matrix based on the covariance matrix of the downmix signal and the spatial parameter(s) relating to the parametrically coded audio signal. For example, as per the foregoing descriptions of exemplifying methods for mixing or combining parametrically coded audio signals and covariance matrices, an original N-channel signal X may be downmixed to an M-channel signal Y=DX in the encoder, where D is an M×N downmix matrix. In the decoder, an approximation $\hat{X}$ of the input signal may be reconstructed from the downmix signal Y as $\hat{X}$=CY+Pd(QY). The covariance of the decoded signal can be expressed as $R_{\hat{X}\hat{X}}=CR_{YY}C^T+P\Lambda P^T$, where Λ is the covariance matrix of the K decorrelator output signals, i.e., the diagonal part of $QR_{YY}Q^T$. Generally, C, Q and P may be determined based on the spatial parameter(s) relating to the parametrically coded audio signal of the bitstream. In A-JOC, for example (see Purnhagen, H., Hirvonen, T., Villemoes, L., Samuelsson, J., Klejsa, J., "Immersive Audio Delivery Using Joint Object Coding", Dolby Sweden AB, Stockholm, Sweden, Audio Engineering Society (AES) Convention: 140 (May 2016) Paper Number: 9587), C and P are computed in the encoder and conveyed in the bit stream, and Q is computed in the decoder as $Q=|P|^TC$. The covariance of the downmix signal $R_{YY}$ can be derived by analyzing the actual downmix signal Y (which may require some form of analysis filterbank or transform to enable access to time/frequency tiles), or $R_{YY}$ may be conveyed in the bitstream (per time/frequency tile). Thus, the covariance (e.g., $R_{YY}$) of the downmix signal may be determined (e.g., computed) from the received bit stream. Thereby, the covariance matrix of the signal X may be determined based on the covariance matrix of the downmix signal Y and the spatial parameter(s) relating to the parametrically coded audio signal of the bitstream.

Embodiments of the present invention are not limited to determining of the output covariance matrix 92 by summing the determined first covariance matrix 31 and the determined second covariance matrix 81. For example, determining of the output covariance matrix 92 may comprise determining the output covariance matrix 92 as the one of the determined first covariance matrix 31 and the determined second covariance matrix 81 for which the sum of the diagonal elements is the largest. Such determination of the output covariance matrix 92 may entail determining of the output covariance matrix 92 across inputs based on an energy criterion, for example determining of the output covariance matrix 92 as the one of the determined first covariance matrix 31 and the determined second covariance matrix 81 that has the maximum energy across all inputs.

With further reference to FIG. 3, a modified set 111, including at least one spatial parameter, is determined based on the determined output covariance matrix, wherein the modified set 111 is different from the first set 22 and the second set 72. To that end, the system 300 may include a spatial parameter determination unit 110 that may be configured to determine the modified set 111, including at least one spatial parameter, based on the determined output covariance matrix 92, which determined output covariance matrix 92 may be input into the spatial parameter determination unit 110 after being output from combiner unit 90, as illustrated in FIG. 3.

An output core audio signal is determined based on combined core audio signal 91. The output core audio signal may for example be constituted by the combined core audio signal 91. More generally, the output core audio signal may be based on the first input core audio signal 21 and the second input core audio signal 71.

An output bit stream 121 for a parametrically coded output audio signal is generated, the output bit stream including data representing the output core audio signal and the modified set. To that end, the system 300 may include an output bitstream generating unit 120 that may be configured to generate the output bit stream 121 for a parametrically coded output audio signal, wherein the output bit stream 121 includes data representing the output core audio signal and the modified set 111. As illustrated in FIG. 3, the output bitstream generating unit 120 may take as inputs the output core audio signal and the modified set 111, which have been output from the combiner 90, and output the output bit stream 121. The output bitstream generating unit 120 may be configured to multiplex the output core audio signal and the modified set 111. The output core audio signal may for example be determined by the output bitstream generating unit 120.

The first parametrically coded input audio signal and/or the second parametrically coded input audio signal may represent sound captured from at least two different microphones, such as, for example, sound captured from stereo or First Order Ambisonics microphones. It is to be understood that this is only an example, and that, in general, the first parametrically coded input audio signal and/or the second parametrically coded input audio signal (or the first input bit stream 10 and/or the second input bit stream 60) may represent in principle any captured sound, or captured audio content.

Compared to conventional techniques for processing of parametrically coded audio, in the processing of parametrically coded audio as illustrated in FIG. 3, there may be less or even no need for full decoding of every audio stream and/or re-encoding of the audio streams. Thereby, processing of parametrically coded audio such as illustrated in FIG. 3 may have a relatively high efficiency and/or quality.

It is to be noted that if the input bit streams (e.g., the first input bit stream 10 and the second input bit stream 60 and possibly any additional input bit stream(s)) have synchronized frames, there is no (additional) latency introduced by combining the input bit streams using a system according to one or more embodiments of the invention, such as the system 300 illustrated in FIG. 3. Thus, compared to conventional techniques for processing of parametrically coded audio, in the processing of parametrically coded audio as illustrated in FIG. 3, there may be a relatively low latency for processing of parametrically coded audio, such as mixing.

The first parametrically coded input audio signal, the second parametrically coded input audio signal and the parametrically coded output audio signal may all employ the same spatial parametric coding type.

At least two of the first parametrically coded input audio signal, the second parametrically coded input audio signal and the parametrically coded output audio signal may employ different spatial parametric coding types. The different spatial parametric coding types may for example comprise MPEG parametric stereo parametrization, Binaural Cue Coding, Spatial Audio Reconstruction (SPAR), object parameterization in JOC or A-JOC (e.g., object parameterization in A-JOC for Dolby AC-4), or Dolby AC-4 Advanced Coupling (A-CPL) parametrization. Thus, at least two of the first parametrically coded input audio signal, the second parametrically coded input audio signal and the parametrically coded output audio signal may employ different ones of for example MPEG parametric stereo parametrization, Binaural Cue Coding, SPAR (or a similar coding type), object parameterization in JOC or A-JOC, or A-CPL parametrization.

The first parametrically coded input audio signal and the second parametrically coded input audio signal may employ different spatial parametric coding types. The first parametrically coded input audio signal and the second parametrically coded input audio signal may employ a spatial parametric coding type that may be different from a spatial parametric coding type employed by the parametrically coded output audio signal. The spatial parametric coding types may for example be selected from MPEG parametric stereo parametrization, Binaural Cue Coding, SPAR, object parameterization in JOC or A-JOC, or Dolby AC-4 Advanced Coupling (A-CPL) parametrization.

Thus, systems and methods according to one or more embodiments of the invention can be used to transcode between one spatial parametric coding method to another without requiring a full decode and re-encode of the output signals.

Combining (e.g., mixing) of core audio signals or core audio streams may depend on the design and representation of audio in the audio codec that is used. The combining (e.g., mixing) of core audio signals or core audio streams is largely independent from combining covariance matrices as described herein. Therefore, processing of parametrically coded audio based on determination of covariance matrix/matrices according to embodiments of the invention can in principle be used for example with virtually any audio codec that is based on covariance estimation (encoder) and reconstruction (decoder).

One example of commonly-used core codecs and combining signals thereof are transform-based codecs, which may use a modified discrete cosine transform (MDCT) to represent frames of audio in a transformed domain prior to quantization of MDCT coefficients. A well-known audio codec based on MDCT transforms is MPEG-1 Layer 3, or MP3 in short (cf. "ISO/IEC 11172-3:1993—Information technology—Coding of moving pictures and associated audio for digital storage media at up to about 1.5 Mbit/s—Part 3: Audio", the content of which is hereby incorporated by reference herein in its entirety, for all purposes). The MDCT transforms an audio input frame into MDCT coefficients as a linear process, and hence the MDCT of a sum of audio signals is equal to the sum of the MDCT transforms. For such transform-based codecs, the MDCT representations of the input streams can be combined (e.g., summed) by:

- Decoding the core input bit streams and reconstruct the MDCT transforms for each input.
- Sum the MDCT transforms across input streams (assuming that the same transform size and window shape was used by all input streams).
- Re-encode the summed MDCT transform (e.g., quantize the MDCT magnitude based on an estimated masking curve).

In practice, the masking curve of the summed MDCT transform may need to be determined. One method comprises summing the masking curves in the power domain of each input stream.

It is to be understood that while in the embodiment of the invention illustrated in FIG. 3, two input bitstreams (the first input bit stream 10 and the second input bit stream 60) are received and processed, there could be more than two input bitstreams received and processed (in principle any number of input bitstreams). If more than two input bitstreams would be received and processed, processing of each of the other input bitstream(s) than the first input bit stream 10 and the second input bit stream 60 may take place in the same or similar way as the processing of the first input bit stream 10 and the second input bit stream 60 as described in the foregoing with reference to FIG. 3. Accordingly, for each input bitstream other than the first input bit stream 10 and the second input bit stream 60, and input core audio signal and a covariance matrix may be determined, in the same way or similarly to the first input core audio signal 21 and the second input core audio signal 71 and the first covariance matrix 31 and the second covariance matrix 81 for the first input bit stream 10 and the second input bit stream 60, respectively, so as obtain three or more covariance matrices. Each input bit stream may be processed individually, such as illustrated in FIG. 3 for the first input bit stream 10 and the second input bit stream 60. Each or any of the input bit streams may for example comprise or be constituted by a core audio stream such as an audio signal encoded by a core encoder.

If two or more input bitstreams are received and processed, determining of the output covariance matrix 92 may comprise pruning or discarding one or more covariance matrices with relatively low energy, while the output covariance matrix 92 may be determined based on the remaining covariance matrix or covariance matrices. Such pruning or discarding may be useful for example if one (or more) of the input bitstreams have one or more silent frames, or substantially silent frames. For example, the sum of the diagonal elements for each of the covariance matrices may be determined, and the covariance matrix (or the covariance matrices) for which the sum of the diagonal elements is the smallest (which may entail that the covariance matrix or matrices has/have the minimum energy across all inputs) may be discarded, and the output covariance matrix 92 may be determined based on the remaining covariance matrix or covariance matrices (for example by summing the remaining covariance matrices as described in the foregoing).

According to one or more embodiments of the invention, and similarly to as described in the foregoing, there may further be received one input bit stream without spatial parameters and being mono only, as described in the foregoing as a possible addition to the processing of parametrically coded audio as illustrated in FIG. 1. Thus, in addition to the processing of parametrically coded audio as illustrated in FIG. 3 (or in FIG. 4), a further, such as a third, input bit stream for a mono audio signal may be received (the further or third input bit stream for a mono audio signal is not illustrated in FIG. 3). The further input bit stream may include data representing the mono audio signal. A third covariance matrix may be determined based on the mono audio signal and a matrix including desired spatial parameters for the third input bit stream (which third input bit stream thus is mono only). Based on the first input core audio signal, the second input core audio signal and the mono audio signal, a combined core audio signal may be determined. Based on the determined first covariance matrix, the determined second covariance matrix and the determined third covariance matrix, a combined covariance matrix may be determined (e.g., by summing the first, second and third covariance matrices). The modified set may be determined based on the determined combined covariance matrix, wherein the modified set is different from the first set and from the second set. The output core audio signal may be determined based on the combined core audio signal. For example, the third covariance matrix may be determined based on energy of the mono audio signal (if the mono audio signal is denoted by matrix Y, the energy may be given by YY*, where * denotes conjugate transpose) and a matrix including desired spatial parameters for the third input bit stream. The desired spatial parameters for the third input bit stream may for example comprise one or more of amplitude panning parameters or head-related transfer function parameters (for the mono object associated with the mono audio signal).

While the elements of the system 300 have been described in the foregoing as separate components, it is to be understood that the system 300 may comprise one or more processors that may be configured to implement the above-described functionalities of the demultiplexers 20 and 70, the covariance matrix determining units 30 and 80, the combiner 90, the spatial parameter determination unit 110, and the output bitstream generating unit 120. Each or any of the respective functionalities may for example be implemented by one or more processors. For example, one (e.g., a single) processor may implement the above-described functionalities of the demultiplexers 20 and 70, the covariance matrix determining units 30 and 80, the combiner 90, the spatial parameter determination unit 110, and the output bitstream generating unit 120, or the above-described respective functionalities of the demultiplexers 20 and 70, the covariance matrix determining units 30 and 80, the combiner 90, the spatial parameter determination unit 110, and the output bitstream generating unit 120 may be implemented by separate processors.

Figure 4:
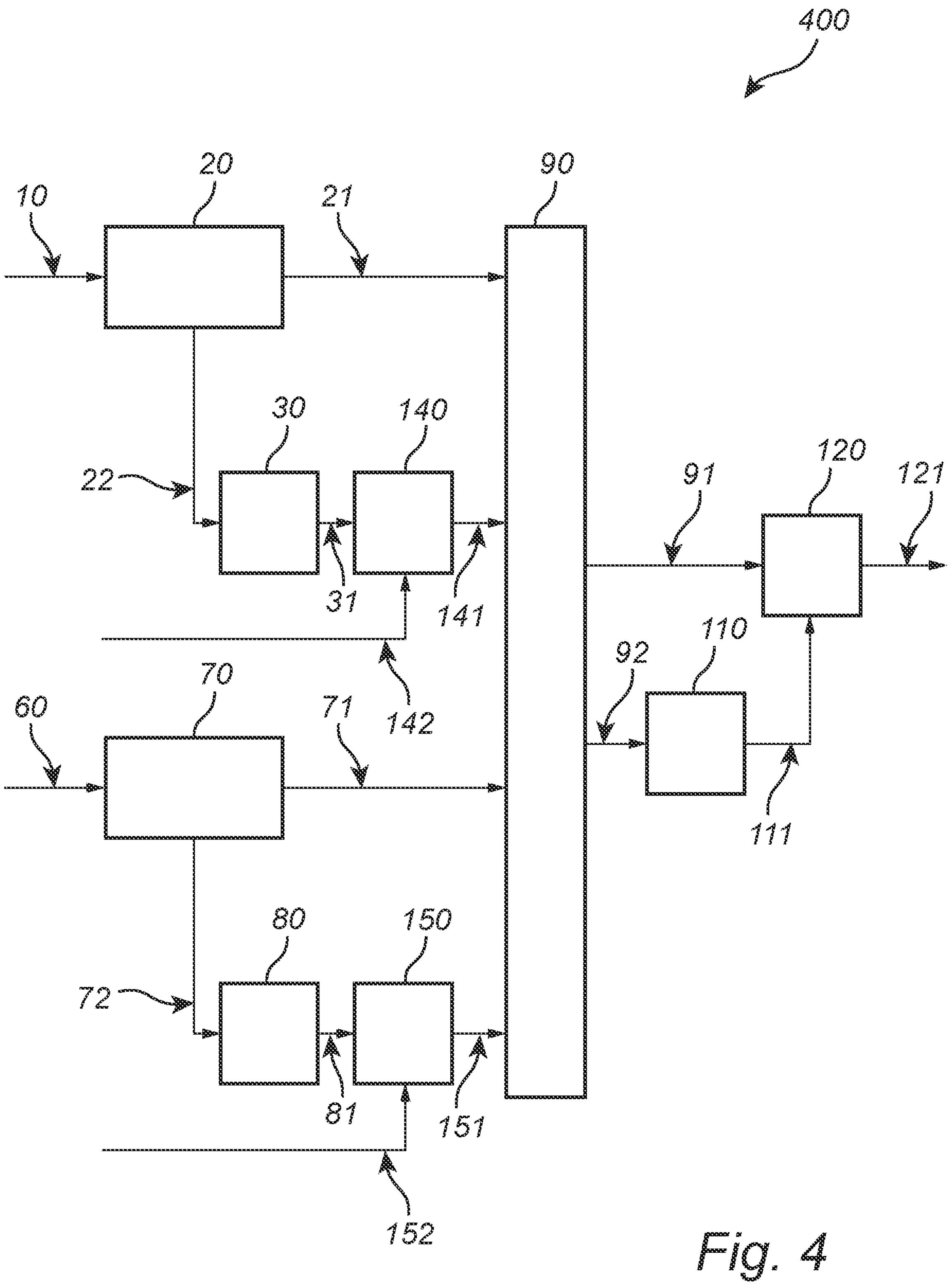

FIG. 4 is a schematic view of a system 400 according to another embodiment of the invention. The system 400 may comprise one or more processors and a non-transitory computer-readable medium storing instructions that are configured to, upon execution by the one or more processors, cause the one or more processors to perform a method according to an embodiment of the invention. The system 400 illustrated in FIG. 4 is similar to the system 300 illustrated in FIG. 3. The same reference numerals in FIGS. 3 and 4 denote the same or similar elements, having the same or similar function. The following description of the embodiment of the invention illustrated in FIG. 4 will focus on the differences between it and the embodiment of the invention illustrated in FIG. 3. Therefore, features which are common to both embodiments may be omitted from the following description, and so it should be assumed that features of the embodiment of the invention illustrated in FIG. 3 are or at least can be implemented in the embodiment of the invention illustrated in FIG. 4, unless the following description thereof requires otherwise.

In the embodiment of the invention illustrated in FIG. 4, a presentation transformation is integrated into the processing of parametrically coded audio, similarly as illustrated in and described with reference to FIG. 2. In the embodiment of the invention illustrated in FIG. 4, a presentation transformation is integrated into the processing of parametrically coded audio for each of the first input bitstream 10 and the second input bitstream 60.

Compared to the system 300 illustrated in FIG. 3, in the system 400 illustrated in FIG. 4, prior to determining the output covariance matrix 92, the determined first covariance matrix 31 is modified based on output bitstream presentation transform data, e.g., output bitstream presentation transform data of the first input bitstream 10, which may comprise a set of signals intended for reproduction on a selected audio reproduction system. Further, also prior to determining the output covariance matrix 92, the determined second covariance matrix 81 is modified based on output bitstream presentation transform data, e.g., output bitstream presentation transform data of the second input bitstream 60, which may comprise a set of signals intended for reproduction on a selected audio reproduction system. It is to be understood that any one of the modifications of the determined second covariance matrices 31, 81 may be omitted, such that possibly only one of the determined second covariance matrices 31, 81 may be modified based on output bitstream presentation transform data, and with the other one of the determined second covariance matrices 31, 81 not being based on output bitstream presentation transform data.

The system 400 may include a covariance matrix modifying unit 140, which may be configured to modify the determined first covariance matrix 31 based on output bitstream presentation transform data 142 of the first input bitstream 10, and/or a covariance matrix modifying unit 150, which may be configured to modify the determined second covariance matrix 81 based on output bitstream presentation transform data 152 of the first input bitstream 60. As illustrated in FIG. 4, the covariance matrix modifying unit 140 may take as inputs (1) output bitstream presentation transform data 142 of the first input bitstream 10 and (2) the first covariance matrix 31 after being output from the covariance matrix determining unit 30, as illustrated in FIG. 4, and output a modified first covariance matrix 141 (as compared to the first covariance matrix 31 output from the covariance matrix determining unit 30 and prior to being modified in the covariance matrix modifying unit 140). As further illustrated in FIG. 4, the covariance matrix modifying unit 150 may take as inputs (1) output bitstream presentation transform data 152 of the second input bitstream 60 and (2) the second covariance matrix 81 after being output from the covariance matrix determining unit 80, as illustrated in FIG. 4, and output a modified first covariance matrix 151 (as compared to the first covariance matrix 81 output from the covariance matrix determining unit 80 and prior to being modified in the covariance matrix modifying unit 150).

Compared to the system 300 illustrated in FIG. 3, in the system 400 illustrated in FIG. 4, the combiner unit 90 may be configured to determine the output covariance matrix 92 based on the determined first covariance matrix 31 and the determined second covariance matrix 81 that have been modified in the covariance matrix modifying unit 140 and in the covariance matrix modifying unit 150, respectively (i.e. the modified first covariance matrix 141 and the modified first covariance matrix 151, respectively).

The output bitstream presentation transform data may comprise at least one of down-mixing transformation data for down-mixing the first input bit stream 10, down-mixing transformation data for down-mixing the second input bit stream 60, re-mixing transformation data for re-mixing the first input bit stream 10, re-mixing transformation data for re-mixing the second input bit stream 60, headphones transformation data for transforming the first input bit stream 10, or headphones transformation data for transforming the second input bit stream 60. The headphones transformation data for transforming the first input bit stream 10 and/or the second input bit stream 60 may comprise a set of signals intended for reproduction on headphones. For example, the output bitstream presentation transform data 142 may comprise at least one of down-mixing transformation data for down-mixing the first input bit stream 10, re-mixing transformation data for re-mixing the first input bit stream 10, or headphones transformation data for transforming the first input bit stream 10, and the output bitstream presentation transform data 152 may comprise at least one of down-mixing transformation data for down-mixing the second input bit stream 60, re-mixing transformation data for re-mixing the second input bit stream 60, or headphones transformation data for transforming the second input bit stream 60.

As described in the foregoing, with reference to FIG. 3, determination of the first covariance matrix 31 may comprise determination of the diagonal elements thereof as well as at least some, or all, off-diagonal elements of the first covariance matrix 31, and determination of the second covariance matrix 81 may comprise determination of the diagonal elements thereof as well as at least some, or all, off-diagonal elements of the second covariance matrix 81.

For example when integrating presentation transformation into the processing of parametrically coded audio for each of the first input bitstream 10 and the second input bitstream 60 such as illustrated in FIG. 4, it may be useful to consider off-diagonal elements of the covariance matrices, and not only diagonal elements thereof. Consider a case where the input bitstreams (e.g., the first input bitstream 10 and the second input bitstream 60) may represent one or more spatial objects which are present in two or more channels (e.g., as a result of amplitude panning, binaural rendering, etc.). Due to this, there may be substantial off-diagonal elements in the covariance matrices (e.g., the first covariance matrix 31 and the second covariance matrix 81) that are important to consider in the processing of parametrically coded audio for the input bitstreams in order to facilitate or ensure that the reproduction of the presentation (s) has the correct covariance structure after the processing (e.g., mixing) of the parametrically coded audio. In order to illustrate the usefulness of considering off-diagonal elements of the covariance matrices, and not only diagonal elements thereof, the above-mentioned case can for example be compared to a case where individual objects (streams), each of which may represent an individual speaker by means of a mono signal, are mixed. In that case, is it reasonable to assume that the streams are mutually uncorrelated, and as a result, there is no (off-diagonal) covariance structure that needs to be taken into account for the mixture of the streams.

In conclusion, a method is disclosed, which method comprises receiving a first input bit stream for a first parametrically coded input audio signal, the first input bit stream including data representing a first input core audio signal and a first set including at least one spatial parameter relating to the first parametrically coded input audio signal. A first covariance matrix of the first parametrically coded audio signal is determined based on the spatial parameter(s) of the first set. A modified set including at least one spatial parameter is determined based on the determined first covariance matrix, wherein the modified set is different from the first set. An output core audio signal is determined, which is based on, or constituted by, the first input core audio signal. An output bit stream for a parametrically coded output audio signal is generated, the output bit stream including data representing the output core audio signal and the modified set. A system is also disclosed, comprising one or more processors, and a non-transitory computer-readable medium storing instructions that are configured to, upon execution by the one or more processors, cause the one or more processors to perform the method. A non-transitory computer-readable medium is also disclosed, which is storing instructions that are configured to, upon execution by one or more processors, cause the one or more processors to perform the method.

One or more of the modules, components, blocks, processes or other functional components described herein may be implemented through a computer program that controls execution of a processor-based computing device of the system(s). It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor-based storage media.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

List of enumerated exemplary embodiments (EEE):

EEE 1. A method comprising:

receiving a first input bit stream for a first parametrically coded input audio signal, the first input bit stream including data representing a first input core audio signal and a first set including at least one spatial parameter relating to the first parametrically coded input audio signal;

determining a first covariance matrix of the first parametrically coded audio signal based on the spatial parameter(s) of the first set;

determining a modified set including at least one spatial parameter based on the determined first covariance matrix, wherein the modified set is different from the first set;

determining an output core audio signal based on, or constituted by, the first input core audio signal; and generating an output bit stream for a parametrically coded output audio signal, the output bit stream including data representing the output core audio signal and the modified set.

EEE 2. The method according to EEE 1, further comprising, prior to determining the modified set, modifying the determined first covariance matrix based on output bitstream presentation transform data of the first input bitstream, wherein the output bitstream presentation transform data comprises a set of signals intended for reproduction on a selected audio reproduction system.

EEE 3. The method according to EEE 2, wherein the output bitstream presentation transform data comprises at least one of down-mixing transformation data for down-mixing the first input bit stream, re-mixing transformation data for re-mixing the first input bit stream, or headphones transformation data for transforming the first input bit stream, wherein the headphones transformation data comprises a set of signals intended for reproduction on headphones.

EEE 4. The method according to any one of EEEs 1-3, wherein the first parametrically coded input audio signal and the parametrically coded output audio signal employ different spatial parametrization coding types.

EEE 5. The method according to EEE 4, wherein the different spatial parametric coding types comprise MPEG parametric stereo parametrization, Binaural Cue Coding, Spatial Audio Reconstruction (SPAR), object parameterization in Joint Object Coding (JOC) or Advanced JOC (A-JOC), or Dolby AC-4 Advanced Coupling (A-CPL) parametrization.

EEE 6. The method according to any one of EEEs 1-5, wherein determining the first covariance matrix comprises determining the diagonal elements thereof as well as at least some off-diagonal elements thereof.

EEE 7. The method according to any one of EEEs 1-6, wherein the first parametrically coded input audio signal represents sound captured from at least two different microphones.

EEE 8. The method according to any one of EEEs 1-7, wherein determining the first covariance matrix of the first parametrically coded audio signal based on the spatial parameter(s) of the first set comprises:

determining a downmix signal of the first parametrically coded audio signal;

determining a covariance matrix of the downmix signal; and determining the first covariance matrix based on the covariance matrix of the downmix signal and the spatial parameter(s) of the first set.

EEE 9. The method according to any one of EEEs 1-8, further comprising:

receiving a second input bit stream for a second parametrically coded input audio signal, the second input bit stream including data representing a second input core audio signal and a second set including at least one spatial parameter relating to the second parametrically coded input audio signal;

determining a second covariance matrix of the second parametrically coded input audio signal based on the spatial parameter(s) of the second set;

based on the first input core audio signal and the second input core audio signal, determining a combined core audio signal; and based on the determined first covariance matrix and the determined second covariance matrix, determining an output covariance matrix;

determining the modified set based on the determined output covariance matrix, wherein the modified set is different from the first set and from the second set;

determining the output core audio signal based on the combined core audio signal.

EEE 10. The method according to EEE 9, wherein the determining of the output covariance matrix comprises:

summing the determined first covariance matrix and the determined second covariance matrix, wherein the sum of the first covariance matrix and the second covariance matrix constitutes the output covariance matrix; or determining of the output covariance matrix as the one of the determined first covariance matrix and the determined second covariance matrix for which the sum of the diagonal elements is the largest.

EEE 11. The method according to EEE 9 or 10, further comprising:

prior to determining the output covariance matrix, modifying the determined first covariance matrix based on output bitstream presentation transform data; and/or prior to determining the output covariance matrix, modifying the determined second covariance matrix based on output bitstream presentation transform data;

wherein the output bitstream presentation transform data comprises a set of signals intended for reproduction on a selected audio reproduction system.

EEE 12. The method according to EEE 11, wherein the output bitstream presentation transform data comprises at least one of down-mixing transformation data for down-mixing the first input bit stream, down-mixing transformation data for down-mixing the second input bit stream, re-mixing transformation data for re-mixing the first input bit stream, re-mixing transformation data for re-mixing the second input bit stream, headphones transformation data for transforming the first input bit stream, or headphones transformation data for transforming the second input bit stream, wherein the headphones transformation data comprises a set of signals intended for reproduction headphones.

EEE 13. The method according to any one of EEEs 9-12, wherein at least two of the first parametrically coded input audio signal, the second parametrically coded input audio signal and the parametrically coded output audio signal employ different spatial parametric coding types.

EEE 14. The method according to EEE 13, wherein the different spatial parametric coding types comprise at least two of MPEG parametric stereo parametrization, Binaural Cue Coding, Spatial Audio Reconstruction (SPAR), object parameterization in Joint Object Coding (JOC) or Advanced JOC (A-JOC), or Dolby AC-4 Advanced Coupling (A-CPL) parametrization.

EEE 15. The method according to any one of EEEs 9-12, wherein the first parametrically coded input audio signal and the second parametrically coded input audio signal employ different spatial parametric coding types.

EEE 16. The method according to any one of EEEs 9-12, wherein the first parametrically coded input audio signal and the second parametrically coded input audio signal employ a spatial parametric coding type different from a spatial parametric coding type employed by the parametrically coded output audio signal.

EEE 17. The method according to any one of EEEs 9-16, wherein at least one of the first parametrically coded input audio signal and the second parametrically coded input audio signal represents sound captured from at least two different microphones.

EEE 18. The method according to any one of EEEs 1-8, further comprising:

receiving a second input bit stream for a mono audio signal, the second input bit stream including data representing the mono audio signal;

determining a second covariance matrix based on the mono audio signal and a matrix including desired spatial parameters for the second input bit stream;

based on the first input core audio signal and the mono audio signal, determining a combined core audio signal;

based on the determined first covariance matrix and the determined second covariance matrix, determining a combined covariance matrix;

determining the modified set based on the determined combined covariance matrix, wherein the modified set is different from the first set;

determining the output core audio signal based on the combined core audio signal.

EEE 19. A system comprising:

one or more processors; and a non-transitory computer-readable medium storing instructions that are configured to, upon execution by the one or more processors, cause the one or more processors to perform a method according to any one of EEEs 1-18.

EEE 20. A non-transitory computer-readable medium storing instructions that are configured to, upon execution by one or more processors, cause the one or more processors to perform a method according to any one of EEEs 1-18.

The invention claimed is:

1. A method comprising:

receiving a first input bit stream for a first parametrically coded input audio signal, the first input bit stream including data representing a first input core audio signal and a first set including at least one spatial parameter relating to the first parametrically coded input audio signal;

determining a first covariance matrix of the first parametrically coded audio signal based on the spatial parameter(s) of the first set;

receiving a second input bit stream for a second parametrically coded input audio signal, the second input bit stream including data representing a second input core audio signal and a second set including at least one spatial parameter relating to the second parametrically coded input audio signal;

determining a second covariance matrix of the second parametrically coded input audio signal based on the spatial parameter(s) of the second set;

based on the first input core audio signal and the second input core audio signal, determining a combined core audio signal; and based on the determined first covariance matrix and the determined second covariance matrix, determining an output covariance matrix;

determining a modified set based on the determined output covariance matrix, wherein the modified set is different from the first set and from the second set;

generating an output bit stream for a parametrically coded output audio signal, the output bit stream including data representing the combined core audio signal and the modified set.

2. The method according to claim 1, further comprising, prior to determining the modified set, modifying the determined first covariance matrix based on output bitstream presentation transform data of the first input bitstream, wherein the output bitstream presentation transform data comprises a set of signals intended for reproduction on a selected audio reproduction system.

3. The method of claim 2, wherein the output bitstream presentation transform data comprises at least one of down-mixing transformation data for down-mixing the first input bit stream, re-mixing transformation data for re-mixing the first input bit stream, or headphones transformation data for transforming the first input bit stream, wherein the headphones transformation data comprises a set of signals intended for reproduction on headphones.

4. The method according to any claim 1, wherein the first parametrically coded input audio signal and the parametrically coded output audio signal employ different spatial parametrization coding types.

5. The method according to claim 4, wherein the different spatial parametric coding types comprise MPEG parametric stereo parametrization, Binaural Cue Coding, Spatial Audio Reconstruction (SPAR), object parameterization in Joint Object Coding (JOC) or Advanced JOC (A-JOC), or Dolby AC-4 Advanced Coupling (A-CPL) parametrization.

6. The method according to claim 1, wherein determining the first covariance matrix and/or second covariance matrix comprises determining the diagonal elements thereof as well as at least some off-diagonal elements thereof.

7. The method according to claim 1, wherein the first parametrically coded input audio signal represents sound captured from at least two different microphones.

8. The method according to claim 1, wherein determining the first covariance matrix of the first parametrically coded audio signal based on the spatial parameter(s) of the first set comprises:

determining a downmix signal of the first parametrically coded audio signal;

determining a covariance matrix of the downmix signal; and determining the first covariance matrix based on the covariance matrix of the downmix signal and the spatial parameter(s) of the first set.

9. The method according to claim 1, wherein the determining of the output covariance matrix comprises:

summing the determined first covariance matrix and the determined second covariance matrix, wherein the sum of the first covariance matrix and the second covariance matrix constitutes the output covariance matrix; or determining of the output covariance matrix as the one of the determined first covariance matrix and the determined second covariance matrix for which the sum of the diagonal elements is the largest.

10. The method according to claim 1, further comprising:

prior to determining the output covariance matrix, modifying the determined first covariance matrix based on output bitstream presentation transform data; and/or prior to determining the output covariance matrix, modifying the determined second covariance matrix based on output bitstream presentation transform data;

wherein the output bitstream presentation transform data comprises a set of signals intended for reproduction on a selected audio reproduction system.

11. The method according to claim 10, wherein the output bitstream presentation transform data comprises at least one of down-mixing transformation data for down-mixing the first input bit stream, down-mixing transformation data for down-mixing the second input bit stream, re-mixing transformation data for re-mixing the first input bit stream, re-mixing transformation data for re-mixing the second input bit stream, headphones transformation data for transforming the first input bit stream, or headphones transformation data for transforming the second input bit stream, wherein the headphones transformation data comprises a set of signals intended for reproduction headphones.

12. The method according to claim 1, wherein at least two of the first parametrically coded input audio signal, the second parametrically coded input audio signal and the parametrically coded output audio signal employ different spatial parametric coding types.

13. The method according to claim 12, wherein the different spatial parametric coding types comprise at least two of MPEG parametric stereo parametrization, Binaural Cue Coding, Spatial Audio Reconstruction (SPAR), object parameterization in Joint Object Coding (JOC) or Advanced JOC (A-JOC), or Dolby AC-4 Advanced Coupling (A-CPL) parametrization.

14. The method according to claim 1, wherein the first parametrically coded input audio signal and the second parametrically coded input audio signal employ a spatial parametric coding type different from a spatial parametric coding type employed by the parametrically coded output audio signal.

15. The method according to claim 1, wherein at least one of the first parametrically coded input audio signal and the second parametrically coded input audio signal represents sound captured from at least two different microphones.

16. The method according to claim 1, further comprising:

receiving a second input bit stream for a mono audio signal, the second input bit stream including data representing the mono audio signal;

determining a second covariance matrix based on the mono audio signal and a matrix including desired spatial parameters for the second input bit stream;

based on the first input core audio signal and the mono audio signal, determining a combined core audio signal;

based on the determined first covariance matrix and the determined second covariance matrix, determining a combined covariance matrix;

determining the modified set based on the determined combined covariance matrix, wherein the modified set is different from the first set;

determining the output core audio signal based on the combined core audio signal.

17. The method according to claim 1, wherein the first parametrically coded input audio signal and the second parametrically coded input audio signal employ different spatial parametric coding types.

18. A system comprising:

one or more processors; and a non-transitory computer-readable medium storing instructions that are configured to, upon execution by the one or more processors, cause the one or more processors to perform a method according to claim 1.

19. A non-transitory computer-readable medium storing instructions that are configured to, upon execution by one or more processors, cause the one or more processors to perform a method according to claim 1.

* * * * *